United States Patent
Pregeant

(10) Patent No.: US 9,478,920 B1
(45) Date of Patent: Oct. 25, 2016

(54) PIVOTAL ELECTRICAL RECEPTACLE

(71) Applicant: Scott Pregeant, Houma, LA (US)

(72) Inventor: Scott Pregeant, Houma, LA (US)

( * ) Notice: Subject to any disclaimer, the term of this patent is extended or adjusted under 35 U.S.C. 154(b) by 0 days.

(21) Appl. No.: 15/049,319

(22) Filed: Feb. 22, 2016

(51) Int. Cl.
| H01R 13/73 | (2006.01) |
| H01R 35/04 | (2006.01) |
| H01R 13/74 | (2006.01) |
| H01R 24/78 | (2011.01) |
| H01R 103/00 | (2006.01) |

(52) U.S. Cl.
CPC .............. H01R 13/74 (2013.01); H01R 24/78 (2013.01); H01R 2103/00 (2013.01)

(58) Field of Classification Search
CPC .... H01R 13/73; H01R 35/04; H01R 25/006; H01R 31/06; H01R 13/652; H01R 2201/15; H01R 13/74
USPC ............................................ 439/534, 11, 107
See application file for complete search history.

(56) References Cited

U.S. PATENT DOCUMENTS

| 3,609,647 A * | 9/1971 | Castellano | H02G 3/16 |
| | | | 174/53 |
| 3,622,684 A * | 11/1971 | Press | H02G 3/185 |
| | | | 174/484 |
| 5,277,620 A * | 1/1994 | Taylor | H01R 13/717 |
| | | | 439/372 |
| 5,967,815 A | 10/1999 | Schlessinger et al. | |
| 5,967,836 A * | 10/1999 | Bailey | H01R 24/76 |
| | | | 439/248 |
| 6,196,851 B1 | 3/2001 | Gerard et al. | |
| 6,332,794 B1 | 12/2001 | Tzeng Jeng | |
| 6,638,074 B1 | 10/2003 | Fisher | |
| D482,661 S | 11/2003 | Shotey et al. | |
| 7,214,102 B2 | 5/2007 | Chong | |
| 7,364,443 B1 * | 4/2008 | McGinnis | H01R 35/02 |
| | | | 439/131 |
| 7,736,178 B2 * | 6/2010 | Byrne | G06F 1/266 |
| | | | 439/527 |
| 7,824,185 B2 * | 11/2010 | Chien | F21S 4/28 |
| | | | 439/11 |
| 8,287,284 B1 | 10/2012 | Nishizawa | |
| 8,986,022 B2 * | 3/2015 | Dinh | H01R 13/5213 |
| | | | 439/131 |
| 2014/0102870 A1 * | 4/2014 | Zien | H01R 25/003 |
| | | | 200/51 R |
| 2015/0009652 A1 * | 1/2015 | Alexander | H01R 35/04 |
| | | | 362/95 |
| 2015/0079810 A1 * | 3/2015 | Brookshire | H01R 25/003 |
| | | | 439/31 |
| 2015/0255937 A1 * | 9/2015 | Loose, Sr. | H01R 25/006 |
| | | | 439/535 |

FOREIGN PATENT DOCUMENTS

WO    WO2012122702    9/2012

* cited by examiner

Primary Examiner — Gary Paumen

(57) ABSTRACT

A pivotal electrical receptacle allowing pivotal movement of plugs includes an outlet that has opposing ends. The outlet comprises a plurality of electrical sockets. A pair of couplers is configured to couple the outlet to an electrical box. Each of a pair of pivots is pivotally coupled to a respective opposing end of the outlet and a respective coupler. Each of a plurality of biasers is operationally coupled to the respective opposing end of the outlet and the respective coupler. The pivots are positioned such that the outlet is pivotable from a default positioned substantially parallel to a plane defined by the substrate in which the electrical box is mounted. The biasers are configured such that pivoting of the outlet induces a force compelling the outlet to return to the default position.

20 Claims, 5 Drawing Sheets

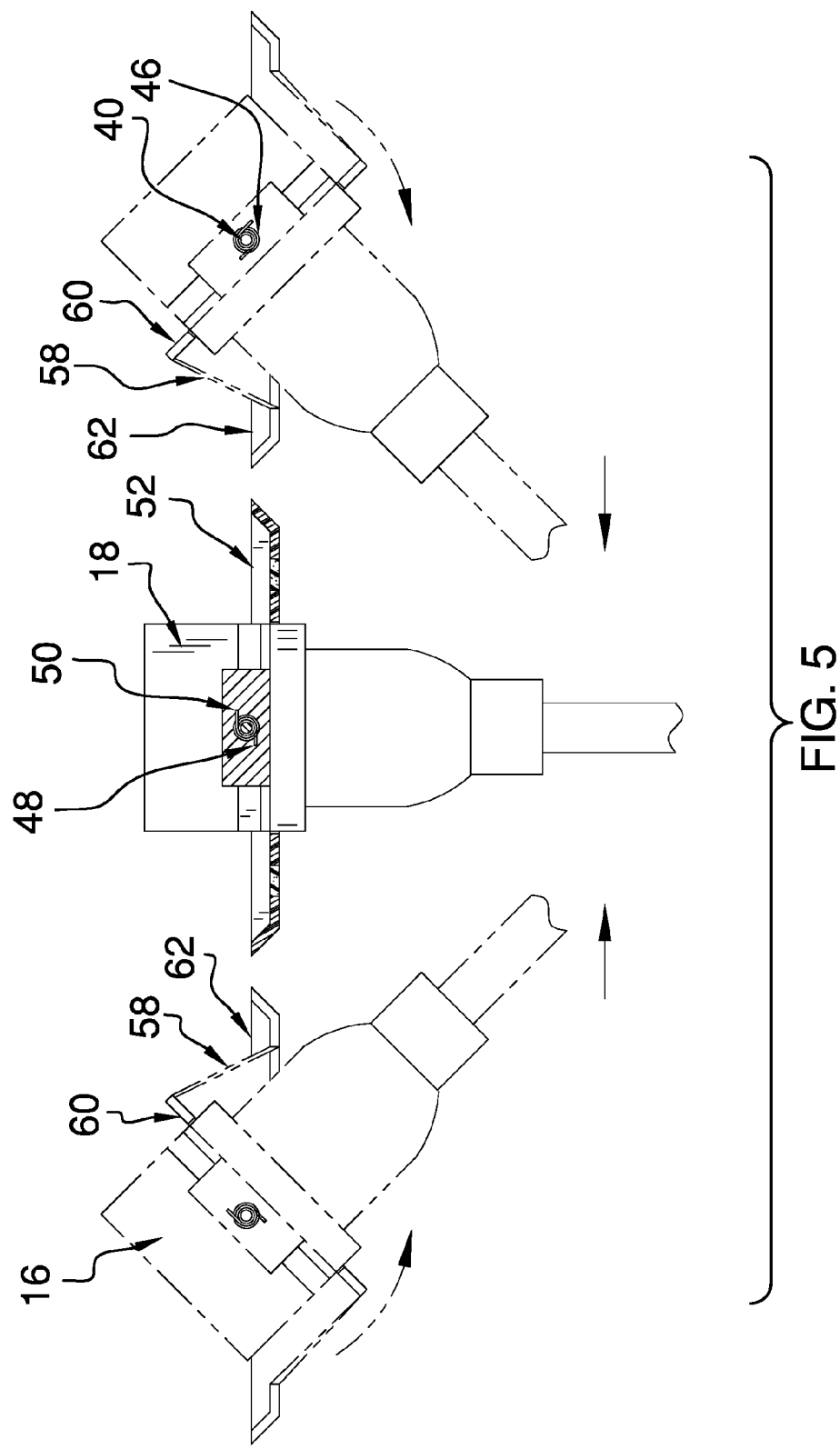

PIVOTAL ELECTRICAL RECEPTACLE

BACKGROUND OF THE DISCLOSURE

Field of the Disclosure

The disclosure relates to electrical receptacles and more particularly pertains to a new electrical receptacle allowing pivotal movement of plugs.

SUMMARY OF THE DISCLOSURE

An embodiment of the disclosure meets the needs presented above by generally comprising an outlet that has opposing ends. The outlet comprises a plurality of electrical sockets. A pair of couplers is configured to couple the outlet to an electrical box. Each of a pair of pivots is pivotally coupled to a respective opposing end of the outlet and a respective coupler. Each of a plurality of biasers is operationally coupled to the respective opposing end of the outlet and the respective coupler. The pivots are positioned such that the outlet is pivotable from a default positioned substantially parallel to a plane defined by the substrate in which the electrical box is mounted. The biasers are configured such that pivoting of the outlet induces a force compelling the outlet to return to the default position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is an in-use view of an embodiment of the disclosure.

DESCRIPTION OF THE PREFERRED EMBODIMENT

Figure 1:
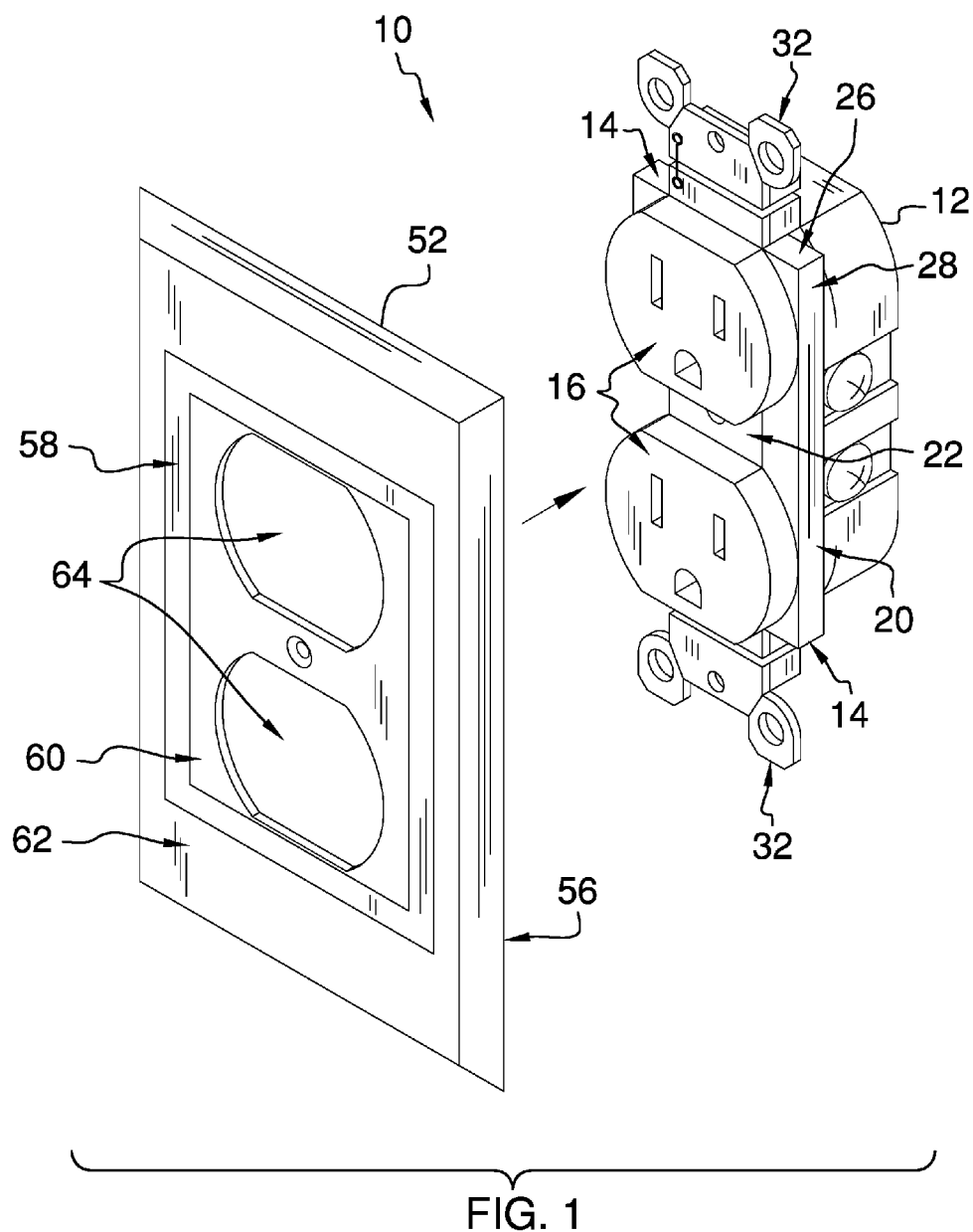
FIG. 1 is an isometric perspective view of a pivotal electrical receptacle according to an embodiment of the disclosure.
Figure 2:
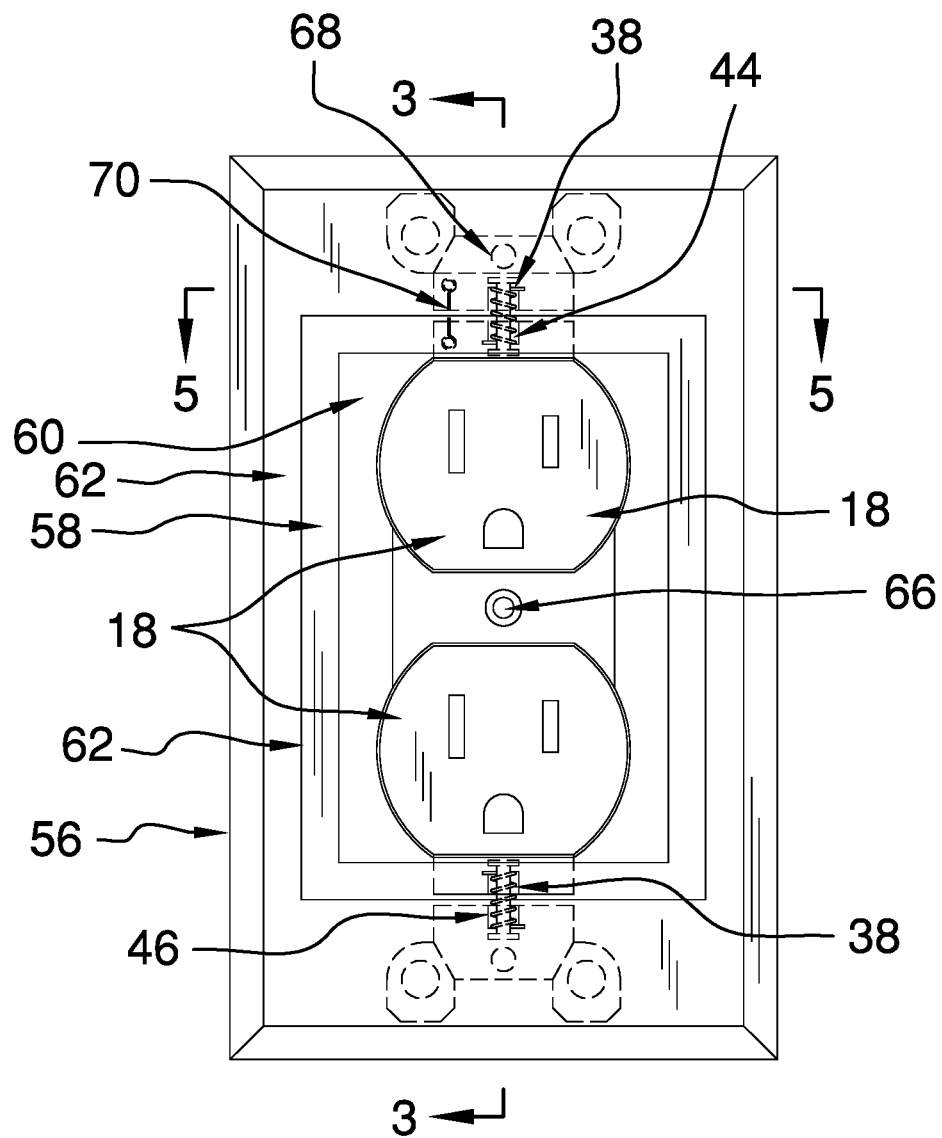
FIG. 2 is a front view of an embodiment of the disclosure.
Figure 3:
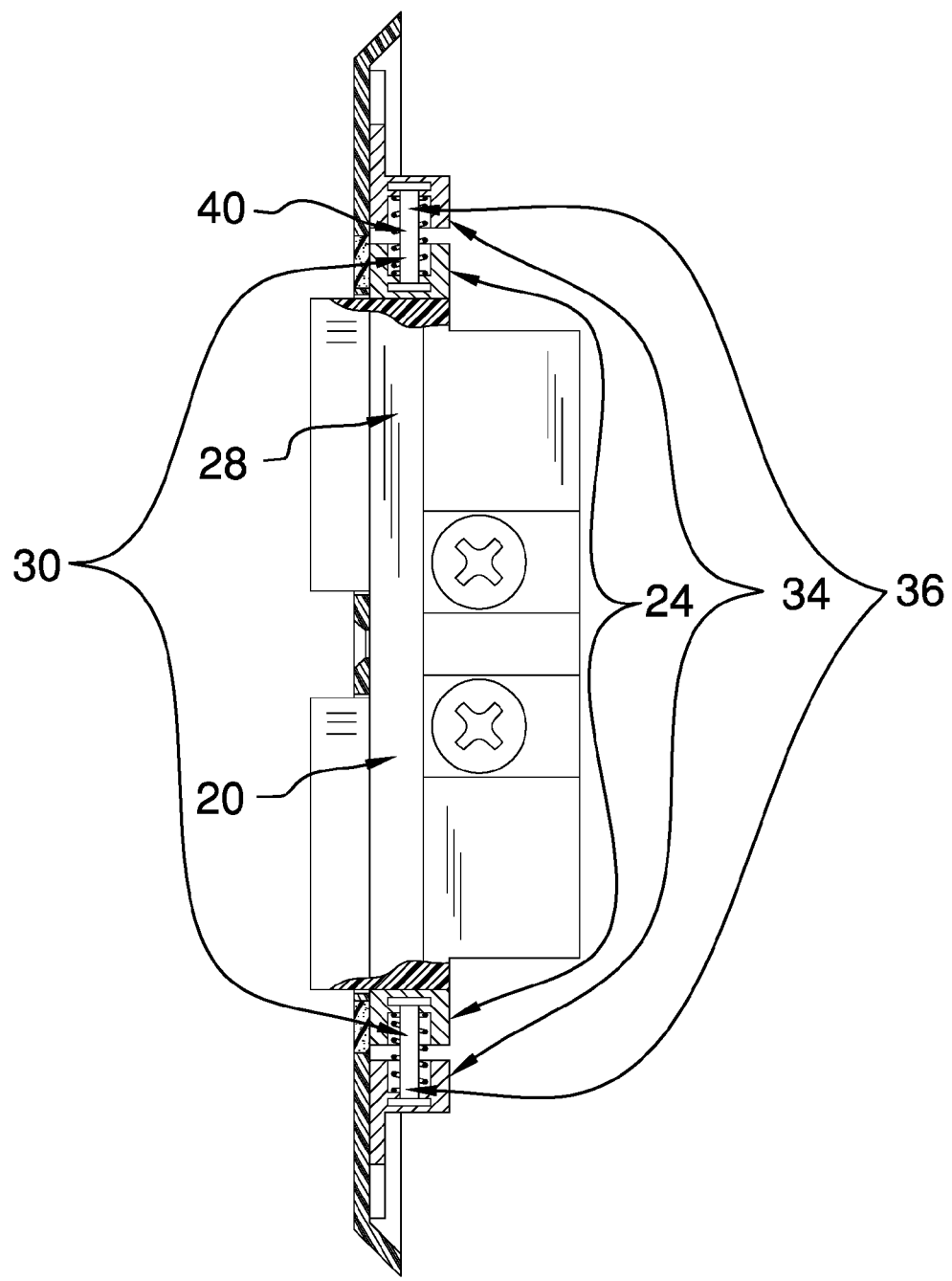
FIG. 3 is a cross-sectional view of an embodiment of the disclosure.
Figure 4:
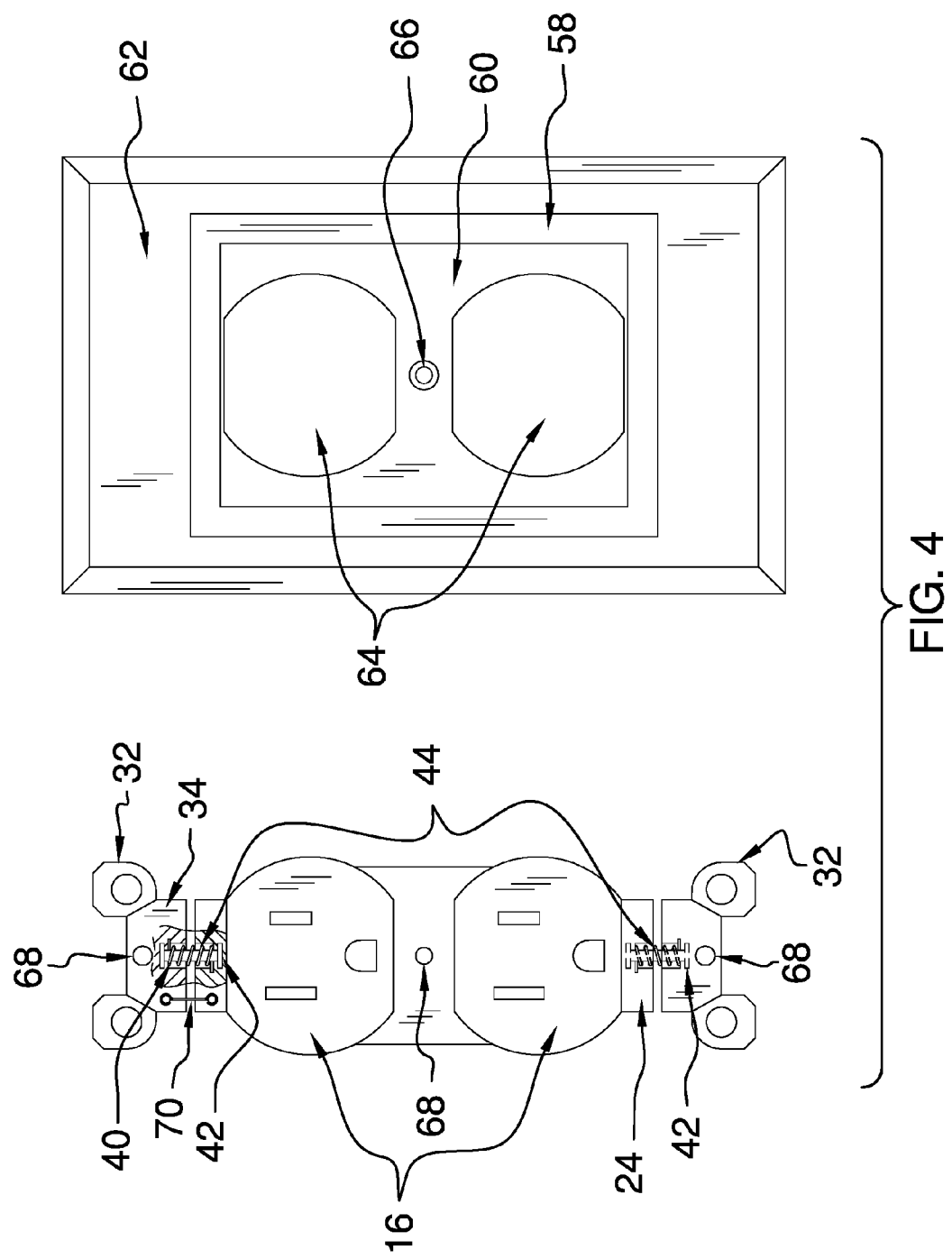
FIG. 4 is a front view of an embodiment of the disclosure.

With reference now to the drawings, and in particular to FIGS. 1 through 5 thereof, a new electrical receptacle embodying the principles and concepts of an embodiment of the disclosure and generally designated by the reference numeral 10 will be described.

As best illustrated in FIGS. 1 through 5, the pivotal electrical receptacle 10 generally comprises an outlet 12 that has opposing ends 14. The outlet 12 comprises a plurality of electrical sockets 16. The plurality of sockets 16 is substantially linearly aligned between the opposing ends 14 of the outlet 12. Preferably, the electrical sockets 16 comprise Type B sockets 18. Also preferably, the plurality of electrical sockets 16 comprises two electrical sockets 16.

The outlet 12 comprises a mount 20 that is rigid and, preferably, rectangular. Each electrical socket 16 is coupled to and extends from a front face 22 of the mount 20. Each of a pair of extensions 24 is coupled to a respective opposing first edge 26 of the mount 20 substantially equally distant from opposing second edges 28 of the mount 20. Each of a pair of first channels 30 is positioned in a respective extension 24 substantially equally distant from the opposing second edges 28 of the mount 20.

The receptacle 10 also comprises a pair of couplers 32 that is configured to couple the outlet 12 to an electrical box. Each coupler 32 comprises a base 34 that is substantially complementary to the extension 24 of the mount 20. Each of a pair of second channels 36 is positioned in a respective base 34, such that each second channel 36 is linearly aligned with an associated first channel 30.

Each of a pair of pivots 38 is pivotally coupled to a respective opposing end 14 of the outlet 12 and a respective coupler 34. Each pivot 38 is positioned in a respective second channel 36 and the associated first channel 30. More specifically, each pivot 38 comprises a shaft 40 that has opposing heads 42. The opposing heads 42 are complementary to the first channels 30 and the second channels 36. The shaft 40 is circular when viewed longitudinally. Preferably, the pivots 38 are positioned to allow the outlet 12 to pivot forty five degrees relative to a default position wherein the outlet 12 is positioned substantially parallel to a plane defined by the substrate in which the electrical box is mounted.

Each of a plurality of biasers 44 is operationally coupled to the respective opposing end 14 of the outlet 12 and the respective coupler 32. Preferably, the biasers 44 comprise springs 46. Each spring 46 is positioned around a respective shaft 40 of the pivot 38. Each spring 46 has a first terminus 48 and a second terminus 50. The first terminus 48 is coupled to the respective opposing end 14 of the outlet 12 and the second terminus 50 is coupled to the respective coupler 32. Preferably, the plurality of biasers 44 comprises two biasers 44.

The receptacle 10 also comprises a plate 52 that is configured to couple to the outlet 12 to cover the electrical box. The plate 52 is positioned such that the outlet 12 is pivotable. More specifically, the plate 52 comprises a panel 54 that is rigid and, preferably, substantially rectangularly shaped. Preferably, the panel 54 has an outer perimeter 56 is beveled. A seal 58 is coupled to and extends between an internal section 60 and an external section 62 of the plate 52. The seal 58 is deformable and preferably comprises flexible rubber. Each of a plurality of penetrations 64 is positioned through the internal section 60. The penetrations 64 are complementary to the electrical sockets 16. Preferably, the plurality of penetrations 64 comprises two penetrations 64. The penetrations 64 are positioned in the plate 52 such that the electrical sockets 16 protrude through the penetrations 64. The seal 58 is positioned to deform as the outlet 12 pivots.

Each of a plurality of first orifices 66 is positioned through the plate 52. The first orifices 66 are complementary to a plurality of second orifices 68 positioned in the outlet 12 and the couplers 32. The first orifices 66 and the second orifices 68 are configured to receive screws to couple the plate 52 to the outlet 12. The first orifices 66 and the second orifices 68 also are configured to receive screws to couple the plate 52 to the couplers 32. Preferably, the plurality of first orifices 66 comprises one first orifice 66 centrally positioned through the seal 58.

A wire 70, which is flexible and, preferably, comprises copper, is coupled to and extends between the respective opposing end 14 of the outlet 12 and the respective coupler 32.

In use, the pivots 38 are positioned such that the outlet 12 is pivotable from a default positioned substantially parallel to a plane defined by the substrate in which the electrical box is mounted. The biasers 44 are configured such that pivoting of the outlet 12 induces a force compelling the outlet 12 to return to the default position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pivotal electrical receptacle comprising:
   an outlet, said outlet having opposing ends, said outlet comprising a plurality of electrical sockets;
   a pair of couplers, said couplers being configured to couple said outlet to an electrical box;
   a pair of pivots, each said pivot being pivotally coupled to a respective said opposing end of said outlet and a respective said coupler;
   a plurality of biasers, each said biaser being operationally coupled to said respective said opposing end of said outlet and said respective said coupler; and
   wherein said pivots are positioned such that said outlet is pivotable from a default positioned substantially parallel to a plane defined by the substrate in which the electrical box is mounted, and wherein said biasers are configured such that pivoting of said outlet induces a force compelling said outlet to return to the default position.

2. The receptacle of claim 1, further including said plurality of sockets being substantially linearly aligned between said opposing ends of said outlet.

3. The receptacle of claim 1, further including said electrical sockets comprising Type B sockets.

4. The receptacle of claim 1, further including said plurality of electrical sockets comprising two electrical sockets.

5. The receptacle of claim 1, further including said outlet comprising:

a mount, said mount being rigid, said mount being rectangular, each said electrical socket being coupled to and extending from a front face of said mount;
a pair of extensions, each said extension being coupled to a respective opposing first edge of said mount substantially equally distant from opposing second edges of said mount; and
a pair of first channels, each said first channel being positioned in a respective said extension substantially equally distant from said opposing second edges of said mount.

6. The receptacle of claim 5, further including each said coupler comprising:
   a base, said base being substantially complementary to said extension of said mount; and
   a pair of second channels, each said second channel being positioned in a respective said base, such that each said second channel is linearly aligned with an associated said first channel.

7. The receptacle of claim 6, further including each said pivot being positioned in a respective said second channel and said associated said first channel.

8. The receptacle of claim 7, further including each said pivot comprising a shaft, said shaft having opposing heads, said opposing heads being complementary to said first channels and said second channels, said shaft being circular when viewed longitudinally.

9. The receptacle of claim 1, further including said pivots being positioned to allow said outlet to pivot forty five degrees relative to a default position wherein said outlet is positioned substantially parallel to a plane defined by the substrate in which the electrical box is mounted.

10. The receptacle of claim 1, further including said plurality of biasers comprises two biasers.

11. The receptacle of claim 1, further including said biasers comprising springs, each said spring being positioned around a respective said shaft of said pivot, each said spring having a first terminus and a second terminus, said first terminus being coupled to said respective said opposing end of said outlet, said second terminus being coupled said respective said coupler.

12. The receptacle of claim 1, further including a plate, said plate being configured to couple to said outlet to cover the electrical box, wherein said plate is positioned such that said outlet is pivotable.

13. The receptacle of claim 1, further including said plate comprising:
   a panel, said panel being rigid;
   a seal, said seal being coupled to and extending an internal section and an external section of said plate, said seal being deformable;
   a plurality of penetrations, each said penetration being positioned through said internal section of said plate, said penetrations being complementary to said electrical sockets;
   a plurality of first orifices, said first orifices being positioned through said plate, said first orifices being complementary to a plurality of second orifices positioned in said outlet and said couplers, wherein said first orifices and said second orifices are configured to receive screws to couple said plate to said outlet and wherein first orifices and said second orifices are configured to receive screws to couple said plate to said couplers; and
   wherein said penetrations are positioned in said internal section of said plate such that said electrical sockets protrude through said penetrations, wherein said seal is positioned to deform as said outlet pivots.

14. The receptacle of claim 13, further including said panel and said internal section of said panel being substantially rectangularly shaped.

15. The receptacle of claim 13, further including said panel having an outer perimeter, said outer perimeter being beveled.

16. The receptacle of claim 13, further including said seal comprising flexible rubber.

17. The receptacle of claim 13, further including said plurality of penetrations comprising two penetrations.

18. The receptacle of claim 13, further including said plurality of first orifices comprising one first orifice centrally positioned through said plate.

19. The receptacle of claim 1, further including a wire, said wire being flexible, said wire comprising copper, said wire being coupled to and extending between said respective said opposing end of said outlet and said respective said coupler.

20. A pivotal electrical receptacle comprising:
  an outlet, said outlet having opposing ends, said outlet comprising:
    a plurality of electrical sockets, said plurality of sockets being substantially linearly aligned between said opposing ends of said outlet, said electrical sockets comprising Type B sockets, said plurality of electrical sockets comprising two electrical sockets,
    a mount, said mount being rigid, said mount being rectangular, each said electrical socket being coupled to and extending from a front face of said mount,
    a pair of extensions, each said extension being coupled to a respective opposing first edge of said mount substantially equally distant from opposing second edges of said mount
    a pair of first channels, each said first channel being positioned in a respective said extension substantially equally distant from said opposing second edges of said mount;
  a pair of couplers, said couplers being configured to couple said outlet to an electrical box, each said coupler comprising:
    a base, said base being substantially complementary to said extension of said mount, and
    a pair of second channels, each said second channel being positioned in a respective said base, such that each said second channel is linearly aligned with an associated said first channel;
  a pair of pivots, each said pivot being pivotally coupled to a respective said opposing end of said outlet and a respective said coupler, each said pivot being positioned in a respective said second channel and said associated said first channel, each said pivot comprising a shaft, said shaft having opposing heads, said opposing heads being complementary to said first channels and said second channels, said shaft being circular when viewed longitudinally, said pivots being positioned to allow said outlet to pivot forty five degrees relative to a default position wherein said outlet is positioned substantially parallel to a plane defined by the substrate in which the electrical box is mounted;
  a plurality of biasers, each said biaser being operationally coupled to said respective said opposing end of said outlet and said respective said coupler, said plurality of biasers comprises two biasers, said biasers comprising springs, each said spring being positioned around a respective said shaft of said pivot, each said spring having a first terminus and a second terminus, said first terminus being coupled to said respective said opposing end of said outlet, said second terminus being coupled said respective said coupler;
  a plate, said plate being configured to couple to said outlet to cover the electrical box, wherein said plate is positioned such that said outlet is pivotable, said plate comprising:
    a panel, said panel being rigid, said panel being substantially rectangularly shaped, said panel having an outer perimeter, said outer perimeter being beveled,
    a seal, said seal being coupled to and extending between an internal section and an external section of said plate, said seal being deformable, said seal comprising flexible rubber, said internal section of said plate being substantially rectangularly shaped,
    a plurality of penetrations, each said penetration being positioned through said internal section of said plate, said penetrations being complementary to said electrical sockets, said plurality of penetrations comprising two penetrations,
    a plurality of first orifices, said first orifices being positioned through said plate, said first orifices being complementary to a plurality of second orifices positioned in said outlet and said couplers, wherein said first orifices and said second orifices are configured to receive screws to couple said plate to said outlet and wherein first orifices and said second orifices are configured to receive screws to couple said plate to said couplers, said plurality of first orifices comprising one first orifice centrally positioned through said plate, and
    wherein said penetrations are positioned in said plate such that said electrical sockets protrude through said penetrations, wherein said seal is positioned to deform as said outlet pivots;
  a wire, said wire being flexible, said wire comprising copper, said wire being coupled to and extending between said respective said opposing end of said outlet and said respective said coupler;
  wherein said pivots are positioned such that said outlet is pivotable from a default positioned substantially parallel to a plane defined by the substrate in which the electrical box is mounted, and wherein said biasers are configured such that pivoting of said outlet induces a force compelling said outlet to return to the default position.

* * * * *